Feb. 10, 1970     H. L. SMITH     3,494,630
BOAT TRAILER FRAME LOWERING APPARATUS
Filed June 25, 1968
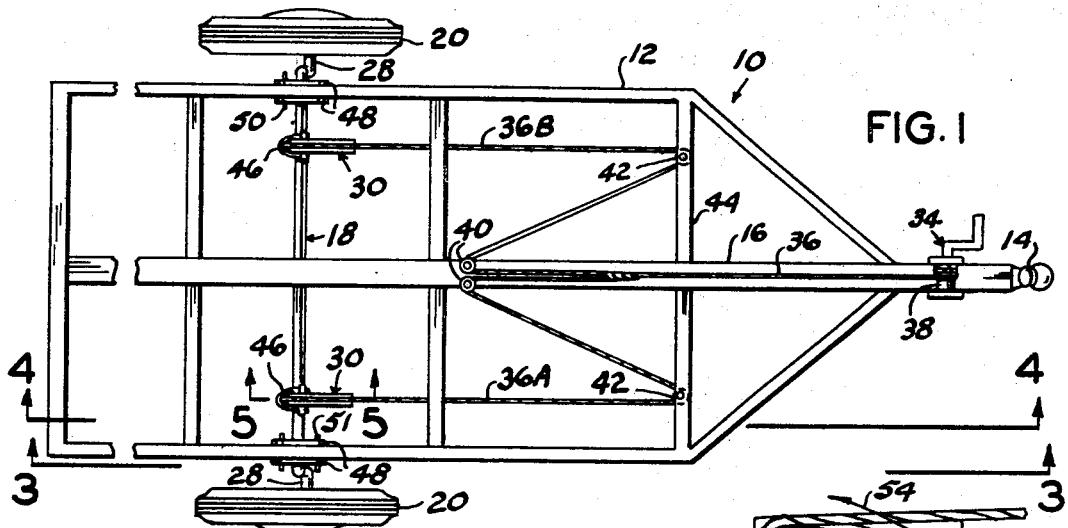
FIG. 1
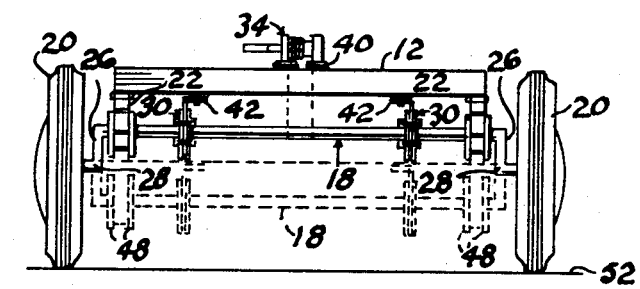
FIG. 2
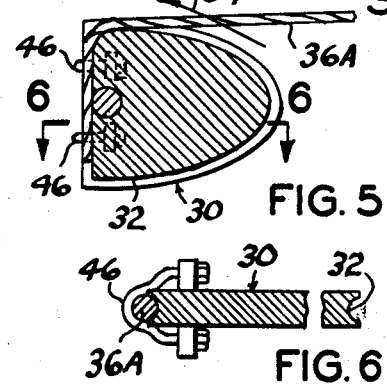
FIG. 5
FIG. 6
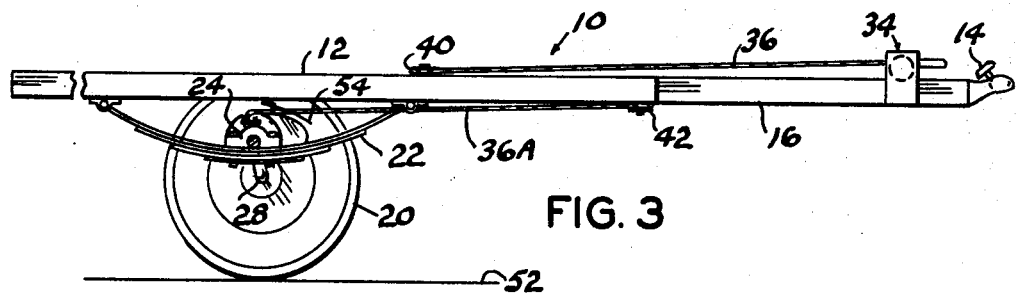
FIG. 3
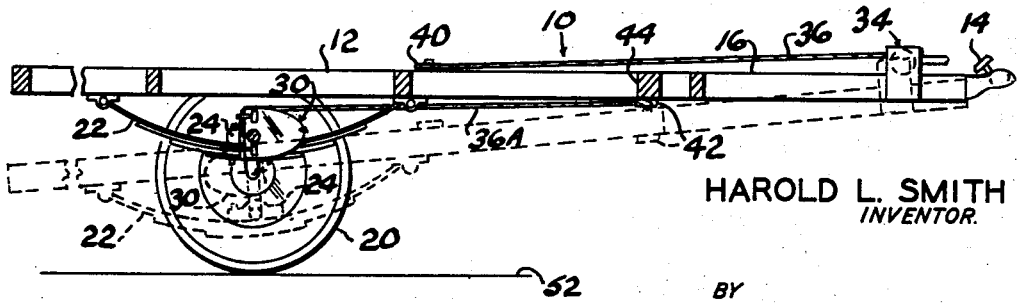
FIG. 4
HAROLD L. SMITH
INVENTOR.
BY
Robert K. Rhea
AGENT

United States Patent Office 3,494,630
Patented Feb. 10, 1970

3,494,630
BOAT TRAILER FRAME LOWERING APPARATUS
Harold L. Smith, 984 Castle, San Leandro, Calif. 94578
Filed June 25, 1968, Ser. No. 739,764
Int. Cl. B62d 21/00
U.S. Cl. 280—43.19
4 Claims

ABSTRACT OF THE DISCLOSURE

A pair of pulley-like cams are secured, in spaced-apart relation, to the central portion of a boat trailer crank axle. Cables, entrained around pulleys secured to the trailer frame, are connected with the cams at one end and at their other ends to a winch mounted on the forward portion of the trailer tongue for rotating the crank axle.

BACKGROUND OF THE INVENTION

The present invention relates to two-wheeled boat trailers and more particularly to an apparatus for lowering the frame or bed of a boat trailer toward and away from the surface of the earth.

Conventional two-wheeled boat trailers, when supporting a boat to be launched, are backed down a boat ramp and into the water until the water supports the boat for unloading or loading. In some locations this requires that the towing car or vehicle be backed down the ramp and into the edge of the water in order to float the boat. This invention permits backing a trailer down a ramp a much shorter distance to obtain the necessary depth of water for loading and unloading a boat while providing a high road clearance for backing or while traveling.

SUMMARY OF THE INVENTION

The transverse wheel supporting axle of a two-wheel boat supporting trailer is replaced with a crank axle which is journaled by bearings mounted on the wheel supporting springs so that each wheel is individually sprung. The crank arm-like ends, at each end of the axle, form spindles which are connected with the wheels in a conventional manner. A pair of pulley-like cams are secured to the crank axle in spaced relation intermediate its ends. A cable, connected with each cam, is entrained around pulleys mounted on the trailer frame and connected with a winch mounted on the forward end portion of the trailer tongue so that the crank axle may be rotated about its longitudinal axis to pivot its arms and raise or lower the rearward end portion of the trailer bed or frame by winding or unwinding the cable on the winch drum. This provides the trailer with a high roadway clearance in its elevated position and when backed down a launching ramp permits lowering the trailer frame a substantial distance for ease in loading or unloading a boat.

It is, therefore, the principal object of this invention to provide means for rotating a two-wheel trailer crank axle for raising and lowering the rearward end portion of the trailer frame with respect to the surface of the earth.

BRIEF DESCRIPTION OF THE DRAWINGS

FIGURE 1 is a top plan view of the trailer;
FIGURE 2 is a rear elevational view of the trailer in its elevated position and showing, by dotted lines, the lowered position of the trailer frame;
FIGURE 3 is a side elevational view, partially in section, taken substantially along the line 3—3 of FIG. 1;
FIGURE 4 is a vertical cross-sectional view, partially in elevation, taken substantially along the line 4—4 of FIG. 1 and illustrating, by dotted lines, the lowered position of the trailer frame;
FIGURE 5 is a vertical cross-sectional view, to a larger scale, partially in elevation, taken substantially along the line 5—5 of FIG. 1; and,
FIGURE 6 is a horizontal cross-sectional view, partially in elevation, taken substantially along the line 6—6 of FIG. 5.

DESCRIPTION OF THE PREFERRED EMBODIMENT

Like characters of reference designate like parts in those figures of the drawings in which they occur.

In the drawings:

The reference numeral 10 indicates a substantially conventional two-wheeled trailer comprising a cross braced frame 12 having a conventional trailer hitch 14 at the forward end of its longitudinally extending tongue 16, a transverse crank axle 18 and a pair of wheels 20. The trailer is further provided with a pair of substantially conventional semi-elliptic spring members 22 which are shackle mounted at their respective ends and depend from the respective frame side member for supporting the wheels 20. The respective end portions of the axle 18, adjacent its crank arm ends 26, are journaled by pillow block bearings 24 mounted on the respective spring 22. The respective end of the crank axle, projecting outwardly of the respective bearing 24, forms a spindle 28 which coaxially journals the respective wheel 20. This permits the central portion of the crank axle 18 to be rotated about the horizontal axis formed by the wheels 20 and lower the trailer bed or frame 12, as illustrated by dotted lines (FIGS. 2 and 4), in the manner presently described.

A pair of cams 30, which are pulley-like in general configuration, defined by a grooved periphery 32 and substantially semi-ovate in side elevation (FIG. 6), are rigidly secured to the axle 18 in parallel spaced-apart relation between the frame sides. Each of the cams 30 are disposed edgewise and at right angle with respect to the longitudinal axis of the axle 18 and with their ovate end portion projecting toward the forward end of the trailer frame, as shown by solid lines (FIGS. 1, 3 and 4).

A handle operated winch 34 is mounted on the upper surface of the forward end portion of the tongue 16 and has one end of a cable 36 secured thereto and wound around its drum 38. The other end of the cable 36 is divided to provide cable end portions 36A and 36B. The cables 36A and 36B are respectively entrained around a juxtaposed pair of pulleys 40 mounted on the upper surface of the tongue 16 forwardly of the transverse position of the axle 18 and a pair of pulleys 42 mounted in spaced relation on the under surface of the forwardmost frame cross brace 44. The free end of each of the cables 36A and 36B is then extended rearwardly and over the respective cam 30 and secured thereto by clamps 46.

As shown more clearly in FIGS. 1 and 3, the transverse axis of the spindles 28 is preferably maintained slightly off-set forwardly of the axis of the central portion of the crank axle 18 so that the cams 30 rotate about the axis of the axle 18 in a desired direction during the trailer lowering operation.

A pair of thrust washers or flanges 48 are secured to the crank axle 18 on opposing sides of the bearings 24 which prevents longitudinal movement of the axle through the bearings. Diametrically each of the flanges 48 is great enough so that they project radially outward of the upper limit of the bearings 24 for locking the trailer frame in its raised position. This locking of the trailer frame in its raised position is accomplished by a line drilled hole through the flanges 48 which receives locking pins 50 and 51. The pins 50 and 51 are positioned in off-set relation with respect to each other (FIG. 1). Stated another way the pin 50 extends through the flanges 48 above the rearward end portion of the bearing 24 while the pin 51 is disposed transversely of the forward end portion of the other bearing 24. This prevents any play or rotation of the axle 18 while traveling. Obviously additional pins 50 and 51 may be used, if desired. The pins 50 and 51 supplement the conventional winch locking dog, not shown, in supporting the trailer frame in a raised position for travel.

OPERATION

In operation, when it is desired to lower the trailer frame with respect to the surface of the earth, indicated by the line 52, the locking pins 50 and 51 are removed and the winch 34 is operated to unwind the cable 36. Since the axis of the wheels 20 is disposed forwardly of the axis of the axle central portion, the cams 30 rotate counterclockwise, as viewed in the drawings, toward the rearward end of the trailer frame, in the direction of the arrows 54, while simultaneously rotating the crank axle 18 about the transverse axis of the wheels 20. The cable end portions 36A and 36B are nested by the cam grooves 32 in pulley fashion until the cams and trailer frame assumes the dotted line position of FIGS. 2 and 4 wherein the crank axle 18 has been rotated substantially 90°. After unloading or loading the boat, not shown, the trailer frame is raised to its upper most or traveling position by winding the cable 36 about the winch drum 38. The configuration of the cams 30, supplemented by the pairs of pulleys 40 and 42, thus provide a mechanical advantage which renders the raising of the trailer frame relatively easy. The winch locking dog then holds the trailer frame in its elevated position until secured by the locking pins 50 and 51.

Obviously the invention is susceptible to some change or alteration without defeating its practicability, and I therefore do not wish to be confined to the preferred embodiment shown in the drawings and described herein.

I claim:

1. In combination with a two-wheel trailer frame having a wheel supported crank axle, the improvement comprising: means for rotating said axle about the axis of said wheels and raising and lowering said frame with respect to a supporting surface, said means including a semi-ovate cam member centrally secured at its minor axis to said axle for rotation therewith and disposed in a plane perpendicular with respect to the axis of said axle, said cam member having a grooved periphery; cable means including a cable having one end portion entrained through the groove of said cam member for controlling the rotation of said cam member; and, a clamp secured to said cam member adjacent said axle and gripping said one end portion of said cable.

2. Structure as specified in claim 1 in which said cable means further includes a winch mounted on the forward portion of said trailer frame, said winch having a drum; said cable having its other end portion wound around said drum.

3. Structure as specified in claim 2 and a plurality of pulleys secured to said frame and having said cable entrained therearound.

4. Structure as specified in claim 3 in which said frame is provided with a pair of semi-elliptical springs, and a bearing secured to each said spring and journalling the respective end portion of said crank axle.

References Cited

UNITED STATES PATENTS 2,577,246    12/1951    Hill _____ 280—43.19
2,807,381    9/1957    Tegeler _____ 280—43.19

LEO FRIAGLIA, Primary Examiner

R. R. SONG, Assistant Examiner

U.S. Cl. X.R.

280—414